Dec. 9, 1930.    E. R. POLLARD    1,784,028
WEDGE CUTTING MACHINE
Filed Sept. 13, 1929    3 Sheets-Sheet 1
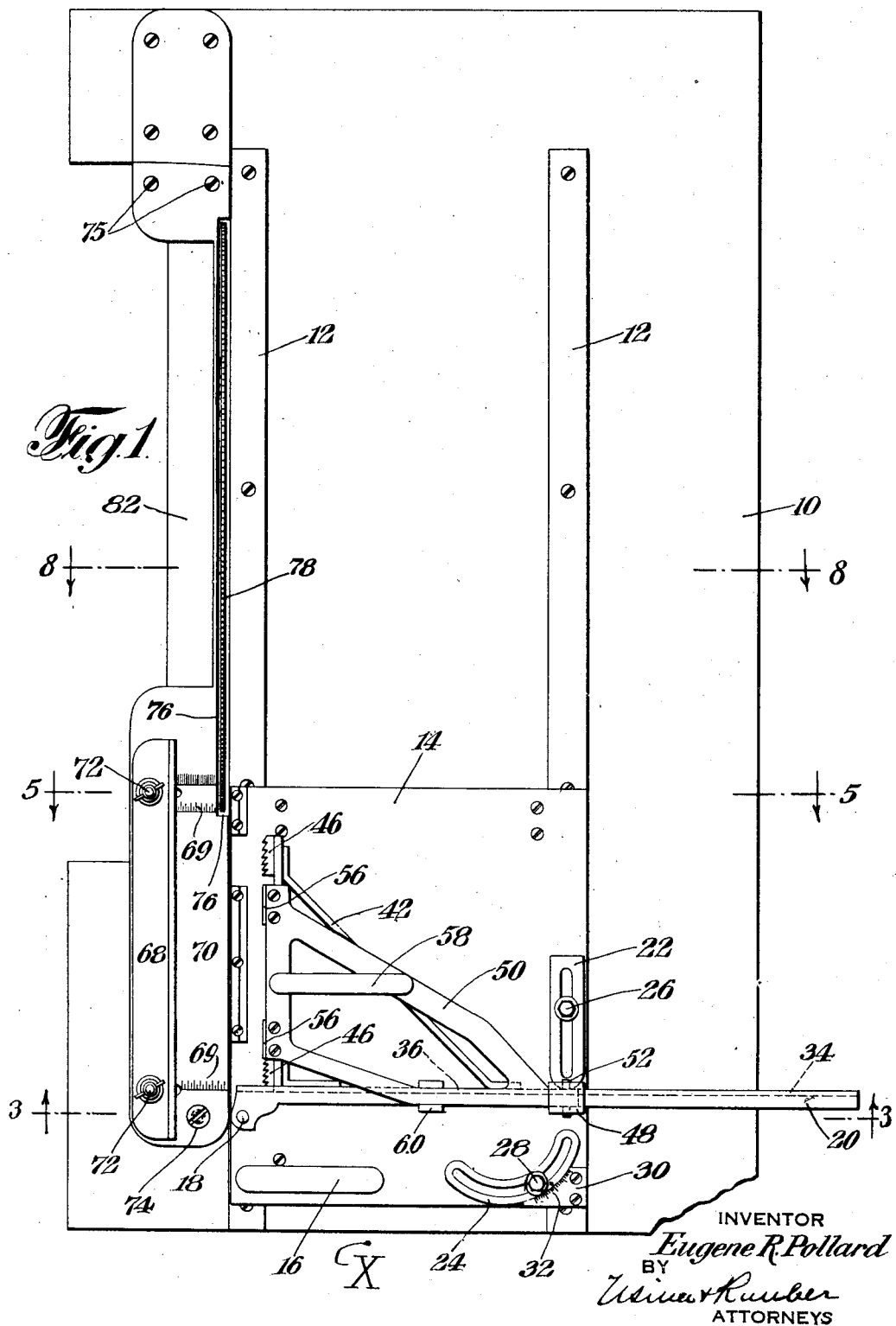
INVENTOR
Eugene R. Pollard
BY
ATTORNEYS Dec. 9, 1930.  E. R. POLLARD  1,784,028
WEDGE CUTTING MACHINE
Filed Sept. 13, 1929     3 Sheets-Sheet 2
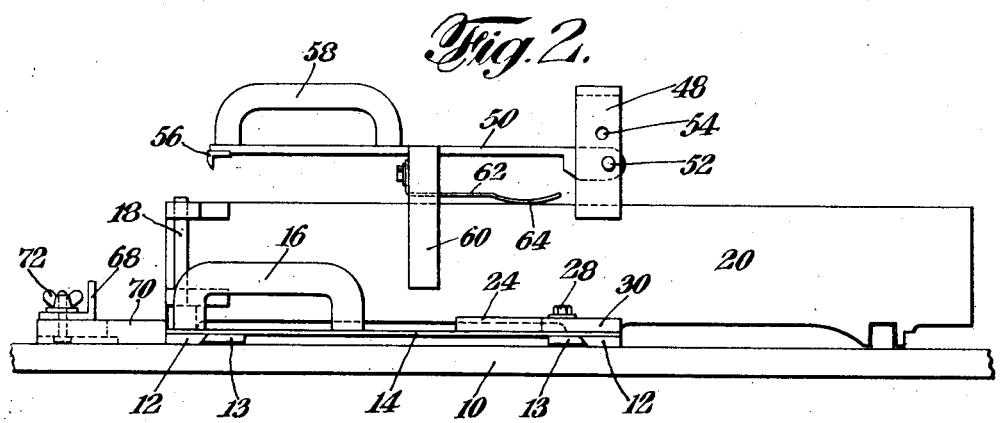
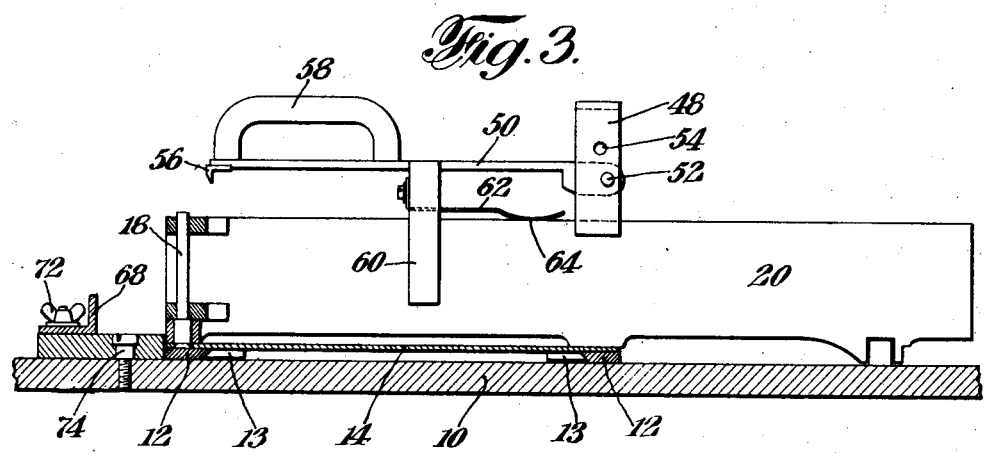
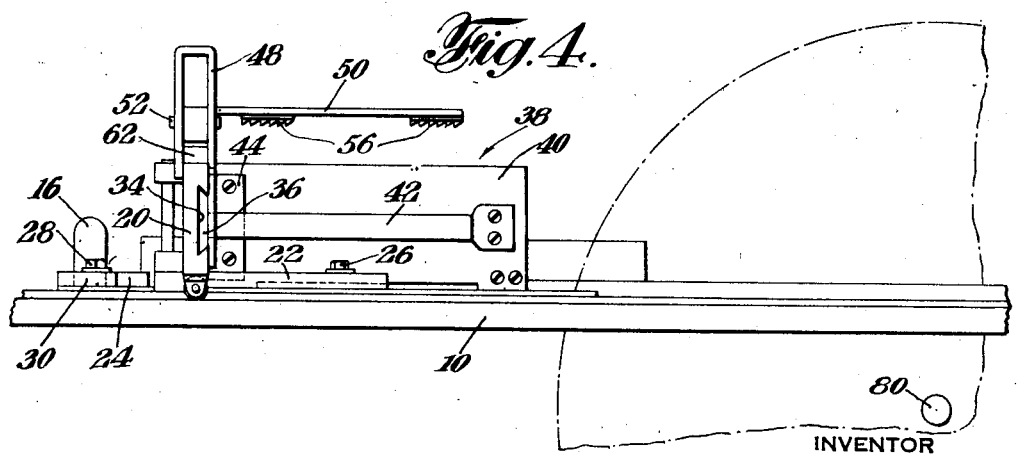
INVENTOR
*Eugene R. Pollard*
BY
ATTORNEYS Dec. 9, 1930.   E. R. POLLARD   1,784,028
WEDGE CUTTING MACHINE
Filed Sept. 13, 1929    3 Sheets-Sheet 3
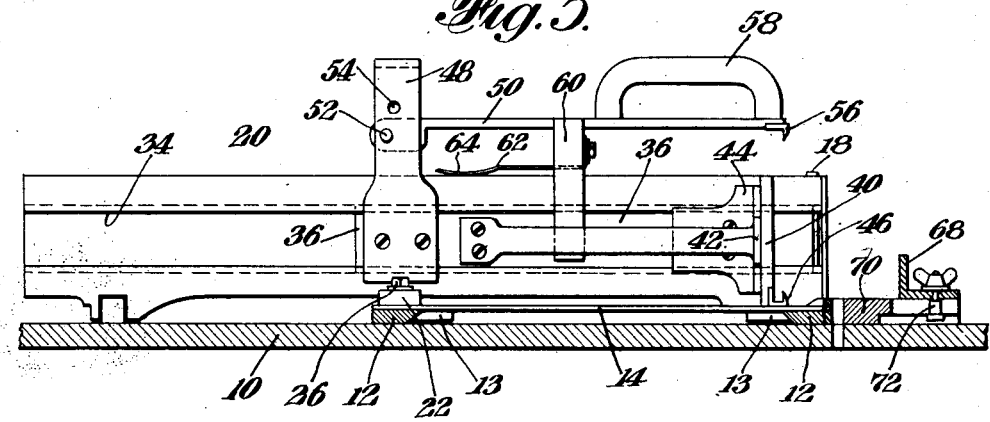
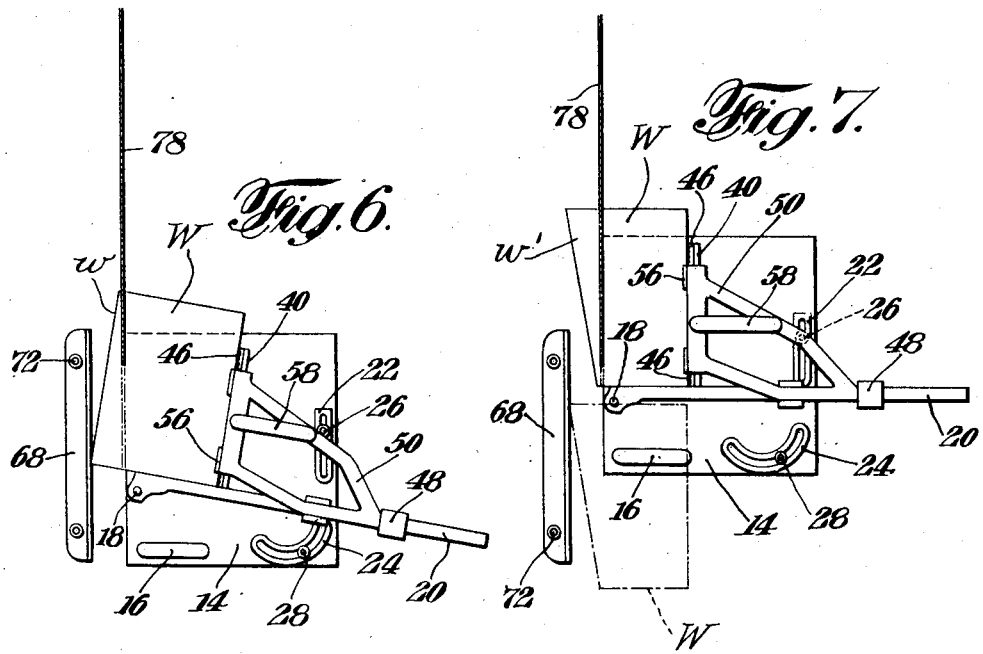
INVENTOR
Eugene R. Pollard
BY
ATTORNEYS Patented Dec. 9, 1930

1,784,028

UNITED STATES PATENT OFFICE

EUGENE R. POLLARD, OF MIAMI, ARIZONA

WEDGE-CUTTING MACHINE

Application filed September 13, 1929. Serial No. 392,461.

This invention relates to improvements in wedge cutting machines, and while not limited thereto, aims to provide means whereby blocks of substantially prismatic form can be readily cut up into a multiplicity of wedges, having a predetermined taper. The machine illustrated includes a rotary circular saw and means for moving a wooden block into operative engagement therewith, but it is to be understood that the invention may also be embodied in machines for cutting metal, stone and other materials.

The invention will be apparent from the following specification when read in connection with the accompanying drawings and will be defined with particularity in the appended claims.

In the drawings

Fig. 1 is a plan view of a machine embodying the invention;

Fig. 2 is an end view from the left of Fig. 1;

Fig. 3 is a vertical transverse section on line 3—3 of Fig. 1;

Fig. 4 is a side elevation of the machine;

Fig. 5 is a section on line 5—5 of Fig. 1;

Figs. 6 and 7 are diagrams illustrating the operation of the machine;

Fig. 8 is a detail section on line 8—8 of Fig. 1.

Referring in detail to the drawings 10 represents a saw table to which is secured a pair of parallel dovetail guide-strips 12—12 which co-act with strips 13—13 secured to the underside of a carriage 14 which is adapted to be manually reciprocated by a handle 16.

Pivoted at 18 to the carriage there is a swingable arm 20 whose angular movement is limited by adjustable stops 22 and 24. Clamp bolts 26 and 28 serve to hold the stops in the positions to which they are set. The stop 24 is of arcuate form and is guided by a block 30, having graduations 32 thereon which are calibrated to indicate the taper of the wedges to be cut.

The swingable arm 20 has a dovetail groove 34 formed therein for guiding a slide 36 which forms part of the work-holder indicated as a whole by numeral 38. This work-holder includes a work engaging plate 40 which is secured to the slide 34 by a brace 42 and an angle bar 44. The plate 40 carries toothed members 46 which are adapted to dig into the bottom of the work to assist in holding it during the cutting operation.

The slide 36 carries a yoke 48 which forms an adjustable support for a hold-down 50. The latter is pivoted on a pin 52 which is adapted to be engaged with a selected one of a plurality of holes 54 formed in the yoke 48, so as to accommodate work pieces of varying thickness. The hold-down carries work engaging teeth 56, which are adapted to grip the work when a handle 58 is swung downwardly about the pivot pin 52.

A yoke 60 secured to the hold-down is provided with downwardly extending legs, which strandle opposite sides thereof. This yoke carries a spring 62, the outer end 64 of which rests on the top of the swinging arm 20 and serves to yieldingly position the hold-down, and to support it when there is no work in cutting position.

For gauging the thickness of wedges to be cut I provide a member 68 which is adjustably secured to a swingable base 70, by thumb-screws 72—72. The base 70 is pivoted on a shouldered screw 74, secured to the saw table and is cut away at 76 to provide clearance for the circular saw or other cutter 78 which is rotatably mounted in suitable bearings 80, carried by the saw table. An intermediate portion 82 of the base 70 is bevelled as shown in Fig. 8, so that the piece severed by the saw will be guided away therefrom by gravity.

In operation the operator standing in the neighborhood of the point X in Fig. 1 places a substantially rectangular or prismatic block on the sliding carriage 14 engaging the work with the teeth 46 and against the face of the plate 40 of the work holder. The hold-down is then swung down by handle 58 to engage the teeth 56 with the top of the work. The gauge 68 is assumed to have been previously set with the aid of graduations 69 to a position which will determine the thickness of the butt end of the wedges to be cut.

The stop 22 is set to the position shown in Figs. 6 and 7, so as to locate the arm 20 at right angles to the saw. The stop 24 is then adjusted with the aid of graduations 32, to a position to cut a wedge of the desired taper. The swinging arm is then swung from the position of Fig. 7 to the position of Fig. 6, the slide 36 having been moved to the left along the member 20 until the corner of the work block contacts with the gauge 68. The operator then grasps the handle 16 and pushes the carriage and work W toward the saw. During this stroke the saw severs the first wedge $w$ from the block or work piece, the point of the wedge thus formed being away from the operator. The carriage is then drawn toward the operator, the work clearing the saw. Now the arm 20 is swung to the position of Fig. 7 against the stop 22 and the slide is moved to the left until the corner of the stock or work piece strikes the gauge whereupon the carriage is again pushed forward. This stroke severs the wedge $w'$ (Fig. 7) the point of the wedge being toward the operator. For the third forward stroke the arm is moved to position of Fig. 6 and the above described operation repeated. Similar strokes are repeated until the block W is all cut up into wedges of the desired taper and of predetermined thickness at the butt according to the respective settings of the stops 22—24 and the gauge 68. The severed wedges fall away from the saw due to the inclination of the bevelled part 82 of the member 70.

When it is desired to change saws the member 70 can be readily swung about the pivot 74 after first removing the holding screws 75. From the foregoing it is clear that the invention can be applied to existing circular or band saw tables, that wedges of predetermined size and taper can be quickly and cheaply made, that the saw can be easily removed for replacement or repair, that the fact that the block is easily loaded on the carriage when starting and thereafter requires no further handling makes for rapid and economical or mass production, that the graduated stops contribute to ease of setting and uniformity of product and that there is no waste of raw material as the entire block or work piece is cut up into wedges.

While I have described with great particularity the specific embodiment of the invention illustrated, it is to be understood that I am not limited thereto since various modifications may be made by those skilled in the art without departing from the invention as defined in the appended claims.

I claim:

1. A machine for cutting a plurality of wedges in a substantially prismatic block, comprising a rotary saw, a member pivotally mounted on one side thereof and carrying an adjustable gauge adapted to be set to determine the thickness of the butt ends of the wedges, a carriage on the opposite side of and movable toward and from the saw, a swingable arm supported on the carriage, work supporting means slidable along said arm in a direction transverse to the line of movement of the carriage, and adjustable stops on the carriage adapted to limit the swinging movement of said arm.

2. A machine for cutting a plurality of wedges from a substantially prismatic block comprising a vertically disposed saw, a gauge on one side thereof adapted to be set to determine the thickness of the butt ends of the wedges to be cut, a carriage movable in a horizontal plane on the opposite side of the saw, an arm pivoted on the carriage and swingable in a horizontal plane, work holding means slidable in guides formed in said arm and stops adjustably secured to said carriage for limiting the angular movement of said arm.

3. A machine of the character described for cutting wedges including a rotary saw, whose cutting edge is disposed in a vertical plane, a work supporting carriage on one side of the saw having a pivotally mounted arm adapted to support a block from which the wedges are to be cut and a member pivoted on the opposite side of the saw and carrying a gauge adapted to determine the thickness of the butt ends of the wedges, said member also having a bevelled portion extending across the face of the saw over which the wedges are adapted to slide when severed from the block supported by the carriage on the opposite side of the saw.

In witness whereof, I have hereunto signed my name.

EUGENE R. POLLARD.